United States Patent [19]

Benjamin

[11] Patent Number: 4,486,565

[45] Date of Patent: Dec. 4, 1984

[54] PRIMER COMPOSITIONS FOR IMPROVING ADHESION OF ABRASION RESISTANT SILICONE COATINGS TO PLASTIC SURFACES

[75] Inventor: Kelly L. Benjamin, Freeland, Mich.

[73] Assignee: Dow Corning Corporation, Midland, Mich.

[21] Appl. No.: 467,730

[22] Filed: Feb. 18, 1983

[51] Int. Cl.[3] .................. C08K 5/01; C08K 5/05; C08K 5/06; C08L 83/00
[52] U.S. Cl. .................... 524/506; 427/379; 524/366; 524/380; 524/388
[58] Field of Search ............ 524/588, 366, 506, 380, 524/388

[56] References Cited

U.S. PATENT DOCUMENTS

| | | | |
|---|---|---|---|
| 4,127,697 | 11/1978 | Laurin | 428/412 |
| 4,188,451 | 2/1980 | Humphrey, Jr. | 428/331 |
| 4,207,357 | 6/1980 | Goossens | 427/162 |
| 4,242,381 | 12/1980 | Goossens et al. | 427/387 |
| 4,277,287 | 7/1981 | Frye | 524/268 |
| 4,284,685 | 8/1981 | Olson et al. | 428/331 |
| 4,311,737 | 1/1982 | Ishizaka et al. | 524/588 |
| 4,367,262 | 1/1983 | Vaughn, Jr. | 524/588 |
| 4,390,660 | 6/1983 | Ashby | 524/588 |
| 4,401,500 | 8/1983 | Hamada et al. | 524/588 |
| 4,414,349 | 11/1983 | Vaughn, Jr. et al. | 524/588 |

FOREIGN PATENT DOCUMENTS 92742  7/1980  Japan .
2066101 7/1981  United Kingdom .

OTHER PUBLICATIONS

Cleveland Society for Coatings Technology, Journal of Coatings Technology, 51, 53–58, (1979).

*Primary Examiner*—Allan M. Lieberman
*Attorney, Agent, or Firm*—James E. Bittell

[57] ABSTRACT

Primer compositions are disclosed for improving the adhesion of abrasion resistant polysiloxane coatings to plastic substrates. The primers contain a thermosettable acrylic resin, an aminofunctional organosilicon compound, and optionally an ultraviolet light screening compound. A process employing the primer compositions to provide more durable adhesion of transparent, abrasion resistant polysiloxane coatings on plastic substrates is also disclosed.

16 Claims, No Drawings

PRIMER COMPOSITIONS FOR IMPROVING ADHESION OF ABRASION RESISTANT SILICONE COATINGS TO PLASTIC SURFACES

BACKGROUND OF THE INVENTION

This invention relates to primer compositions and a method of employing the primer compositions to provide durably and tenaciously adhered abrasion resistant siloxane coatings on plastic surfaces. More particularly, this invention relates to primer compositions containing aminofunctional organosilicon compounds and thermosettable acrylic resins. In another aspect, the invention relates to a method of employing the primer compositions to improve the durability of the adhesion of abrasion resistant, colloidal silica filled siloxane coatings on plastic substrates.

Synthetic organic resins are well known materials that have many uses because of their ease of fabrication into desired shapes. One problem that has restricted the use of many resins is a lack of surface hardness and abrasion resistance. This problem is especially severe for resin applications in which transparency is required. In many cases, the rapid accumulation of minor abrasions and scratches on the surface can significantly reduce transparency and make an article essentially useless for its intended purpose.

To overcome this problem, colloidal silica filled organopolysiloxane coatings were developed to greatly improve the surface hardness of organic resins. Typical examples of these coatings are described in U.S. Pat. Nos. 3,986,997, 4,027,073 and 4,355,135. While these coatings have many excellent properties, they do not in all instances possess the desired degree of adhesion to resin surfaces. In particular, the durability of coating adhesion to substrates such as polycarbonate resin is often less than desired.

Methods of improving adhesion by priming the substrates prior to application of the siloxane coating are described in U.S. Pat. Nos. 4,207,357 and 4,284,685. These patents disclose the use of organic solvent solutions or emulsions of thermosettable acrylic resins for priming polycarbonate surfaces to improve adhesion of siloxane coatings. U.S. Pat. No. 4,242,381 further teaches that UV screens can be added to acrylic resin emulsion primers to protect the polycarbonate substrate from ultraviolet light.

Japanese Patent O.P.I. No. 92,742/80 teaches the addition of 3-aminopropyltriethoxysilane to acrylic paint to improve the adhesivity of the paint when it is applied to plastic articles previously coated with an abrasion resistant polysiloxane coating. Specifically, the silane modified acrylic paint is coated over the abrasion resistant polysiloxane coating.

Even though the acrylic resin primers taught by the art do improve adhesion, there is still a need in many instances for increased durability of adhesion. Thus, it is an object of the present invention to provide primer compositions that improve the durability of the adhesion of abrasion resistant polysiloxane coatings to plastic substrates. It is another object of the invention to provide a method of improving the durability of the adhesion of abrasion resistant polysiloxane coatings to plastic substrates. These and other objects of the invention will be apparent to one skilled in the art upon consideration of the following description and appended claims.

SUMMARY OF THE INVENTION

Applicant has discovered a method of improving the adhesion, especially the durability of adhesion, of colloidal silica filled polysiloxane coatings on plastic substrates. The method comprises (A) applying to the surface of a plastic article a primer composition containing from 99 to 70 weight percent of organic solvent and 1 to 30 weight percent of coating components containing (I) a thermosettable acrylic resin and (II) from 0.1 to 50 weight percent based on (I) of an aminofunctional organosilicon compound of the general formula

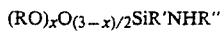

$$(RO)_xO_{(3-x)/2}SiR'NHR''$$

wherein R is hydrogen or a monovalent hydrocarbon radical of 1 to 12 carbon atoms, R' is a divalent alkylene radical of 3 or 4 carbon atoms, R" is a monovalent radical selected from the group consisting essentially of hydrogen, alkyl radicals of 1 to 4 carbon atoms and the $-CH_2CH_2NH_2$ radical, and x has an average value from 0 to 3; (B) evaporating off a substantial portion of the organic solvent of the primer composition; (C) thermally curing the coating components to form a primer layer on the plastic surface; (D) applying over the primer layer, a colloidal silica filled thermoset organopolysiloxane; and (E) thermally curing the colloidal silica filled thermoset organopolysiloxane to an abrasion-resistant silicone coating.

This invention also consists of the method of improving adhesion wherein a UV screen is combined with the coating components of the primer composition to protect the plastic substrate from ultraviolet light. A third aspect of this invention is the primer compositions that are employed in the methods herein to provide the durably adhered abrasion resistant siloxane coatings.

DETAILED DESCRIPTION OF THE INVENTION

This invention is based on the discovery that the combination of a thermosettable acrylic resin and an aminofunctional organosilicon compound in a primer layer provides improved and longer lasting adhesion for colloidal silica filled organopolysiloxane coatings. The adhesion thus obtained is more consistent, uniform and durable than the adhesion obtained when an acrylic resin primer layer is employed without an aminofunctional organosilicon compound.

In accordance with the practice of the present invention, prior to the application of the collidal silica filled organopolysiloxane coating onto the plastic substrate surface, the surface is first primed by the application thereon of a primer composition comprised of a thermosettable acrylic resin, an aminofunctional organosilicon compound and an organic solvent. Alternatively, the primer composition may be comprised of a thermosettable acrylic resin, an aminofunctional organosilicon compound, an ultraviolet light screening compound, and an organic solvent. A substantial portion of the organic solvent is then evaporated off and the resulting layer of coating components is thermally cured to form a primer layer on the plastic surface. The primed surface is then coated with a top coat of colloidal silica filled organopolysiloxane which is thermally cured to form a protective coating for the plastic substrate.

Plastic or resin surfaces that may be coated by the method of this invention to improve the adhesion of the protective topcoat include among others, polysulfone, cellulose acetate butyrate, polyester, styrene-acrylonitrile copolymer, and polycarbonate. It is especially preferred to employ the methods of this invention in coating polycarbonate surfaces to improve the durability and abrasion resistance of the surface for applications that require transparency of the polycarbonate article.

The carbonate polymer surfaces that can be coated by the methods of this invention include the aromatic carbonate polymers of recurring unit formula

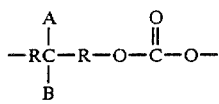

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining —C— atom form a cycloalkane radical, the total number of carbon atoms in A and B being up to 12.

The aromatic carbonate polymers may be prepared by methods well known in the art and as described in U.S. Pat. Nos. 3,161,615, 3,220,973, 3,312,659, 3,312,660, 3,313,777, 3,666,614, and 3,989,672, among others, all of which are incorporated herein by reference.

Also, included are branched polycarbonates wherein a polyfunctional aromatic compound is reacted with the dihydric phenol and carbonated precursor to provide a thermoplastic randomly branched polycarbonate.

Preferred polycarbonate resins may be derived from the reaction of bisphenol-A and phosgene and are well known, commercially available products.

The primer compositions of the present invention generally contain from 1 to about 30 weight percent of coating components. Generally it is preferred to employ primer compositions containing from 5 to 20 weight percent coating components because such compositions provide convenient viscosities for coating. The coating components comprise a thermosettable acrylic resin, an aminofunctional organosilicon compound and optionally a UV light screening compound.

The thermosettable acrylic resins which may be employed in the practice of this invention are well known in the art and are set forth, for example, in *Encyclopedia of Polymer Science and Technology*, Vol. 1, Interscience Publishers, John Wiley & Sons, Inc., copyright 1964, at p. 273 et. seq., and in *Chemistry of Organic Film Formers*, by D. H. Solomon, John Wiley & Sons, Inc., 1967, at p. 251 et seq., and the references cited therein, all of which are incorporated herein by reference.

These thermosettable acrylic polymers include (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups inter-reaction between carboxyl and isocyanate groups; reactions between hydroxyl, for example, polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less and, typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$—$C_2$) alkyl acrylic ester or mixtures thereof, e.g., methyl acrylate, ethyl acrylate, methyl methacrylate, ethyl methacrylate, or mixtures thereof, in an amount ranging between about 75 parts to about 99 parts and, more typically, between about 80 parts to about 97 parts.

A second coating component of the primer composition is an aminofunctional organosilicon compound of the general formula $$(RO)_xO_{(3-x)/2}SiR'NHR''$$

wherein R is hydrogen or a monovalent hydrocarbon radical of 1 to 12 carbon atoms, R' is a divalent alkylene radical of 3 or 4 carbon atoms, R'' is a monovalent radical selected from the group consisting essentially of hydrogen, alkyl radicals of 1 to 4 carbon atoms and the —$CH_2CH_2NH_2$ radical, and x has an average value from 0 to 3.

For the purposes of this invention, R is hydrogen or a monovalent hydrocarbon radical of 1 to 12 carbon atoms. The monovalent hydrocarbon radicals can be, for example, alkyl radicals such as methyl, ethyl, hexyl, octyl, and decyl; aryl radicals such as phenyl; or alkaryl radicals such as benzyl. Each radical represented by R in the silicon compound formula can be the same or different.

In this invention, R' is a divalent alkylene radical of 3 or 4 carbon atoms that represents a divalent bridge between the silicon atom and a nitrogen atom. R' can be, for example, trimethylene, tetramethylene, or a methyl substituted trimethylene radical.

Monovalent radical R'' is selected from the group consisting essentially of hydrogen, alkyl radicals of 1 to 4 carbon atoms and the —$CH_2CH_2NH_2$ radical. For example, R″ can be an alkyl radical such as methyl, ethyl, propyl, or butyl, or R″ can be the 2-aminoethyl radical.

In the formula for the organosilicon compound, x has an average value of 0 to 3 such that the organosilicon compound can be a monomeric aminofunctional organosilane or it can be an aminofunctional organosiloxane formed by hydrolysis and condensation of the organosilane. Preferred aminofunctional organosilanes include 3-aminopropyltriethoxysilane and N-(2-aminoethyl)-3-aminopropyltrimethoxysilane which are both well known, commercially available materials.

Applicant has found that improved adhesion is obtained when the coating components contain from 0.1 to 50 weight percent, based on the weight of acrylic resin, of the aminofunctional organosilicon compound. It is usually preferred to employ from about 1 to 10 weight percent of the aminofunctional organosilicon compound based on the weight of acrylic resin. Although amounts greater than 10 percent are effective, further improvements in adhesion with amounts greater than 10% are generally not observed so that for better economy 10% or less is preferred.

The primer compositions of the instant invention also optionally contain as a third coating component an ultraviolet light absorbing or screening compound. Although the instant primer compositions without ultraviolet light screening compounds effectively improve adhesion of the topcoat, it is preferred to employ an ultraviolet light screen in the primer when coating plastic substrates that are susceptible to ultraviolet light degredation. It is particularly preferred to employ an ultraviolet light screen in the primer when coating transparent polycarbonate articles so that the polycarbonate is protected from ultraviolet light.

The ultraviolet light screening component can be a single ultraviolet light absorbing compound or it can be a mixture of two or more ultraviolet light absorbing compounds. Any ultraviolet light absorbing compound that is sufficiently soluble in the primer composition to provide effective screening of ultraviolet light can be employed in the instant invention. The primer compositions can contain from 0.1 to 100 weight percent of ultraviolet light screening compound based on the weight of acrylic resin. The optimum amount of ultraviolet light screen will depend on the extent of ultraviolet light protection required for the particular application of the plastic article and on the ultraviolet light absorbance of the specific screening compound employed. Generally, applicant has found that a range of 2 to 20 weight percent ultraviolet light screen, based on the weight of acrylic resin, is preferred in most instances.

The ultraviolet light absorbing compounds are well known in the art and are compounds which act to absorb or screen out the ultraviolet radiation. Illustrative of these compounds are those of the hydroxy benzophenone and benzotriazole series, the cyanoacrylates, and benzylidene malonates. Examples of these include: 2-hydroxy-4-n-octoxybenzophenone, substituted hydroxyphenylbenzotriazole, 2-(2′-hydroxy-5′-methylphenyl)-benzotriazole, 2-hydroxy-4-methoxybenzophenone, 2,2′-dihydroxybenzophenone, 2,2′,4,4′-tetrahydroxybenzophenone, 2,2′dihydroxy-4,4′-dimethoxybenzophenone, 2,2′-dihydroxy-4,4′-diethoxybenzophenone, 2,2′-dihydroxy-4,4′-dipropoxybenzophenone, 2,2′-dihydroxy-4,4′-dibutoxybenzophenone, 2,2′-dihydroxy-4′-ethoxybenzophenone, 2,2′-dihydroxy-4-methoxy-4′-propoxybenzophenone, 2,2′-dihydroxy-4-metho $'$- butoxybenzophenone, 2-(2′-hydroxy-5′-tert-butylphenyl)benzotriazole, 2-(2′-hydroxy-3′-methyl-5′-tert-butylphenyl)benzotriazole, 2-(2′-hydroxy-5′-cyclohexylphenyl)benzotriazole, 2-(2′-hydroxy-3′,5′-dimethylphenyl)benzotriazole, ethyl 3,3-diphenyl-2-cyanoacrylate, and octyl 3,3-diphenyl-2-cyanoacrylate. Further examples of ultraviolet light absorbers which may be used in the practice of this invention are illustrated in the examples and include commercially available ultraviolet light screens such as Sanduvor ®3206, hexadecyl-3,5-di-tert-butyl-4-hydroxybenzoate and 2(2′-hydroxy-3′, 5′-di-tert-amylphenyl)benzotriazole.

In the primer compositions of the present invention, the coating components are dissolved in a suitable organic solvent. The particular organic solvents employed in the primer compositions are not critical to the invention since they only act as a carrier to facilitate application of a uniform layer of coating components to the plastic substrates. The solvent is chosen so that it dissolves the coating components but, on the other hand, does not deleteriously dissolve or attack the plastic article during primer application. Generally, appropriate solvent systems are easily obtainable by combining two or more organic solvents in various proportions until the desired solubility characteristics are obtained. Such solvent systems are well known in the art and need not be further detailed. Suitable solvents include, among others, the alkyl mono ethers of ethylene glycol and propylene glycol such as methoxyethanol, methoxypropanol and butoxyethanol; alcohols such as methanol, isopropanol, butanol and ethanol; aromatic solvents such as benzene, toluene and xylene; and ethers such as the dialkyl ethers of ethylene glycol and propylene glycol.

The primer compositions of this invention may optionally contain various leveling agents, stabilizers such an antioxidants, surface-active agents and thixotropic agents. These additives and the use thereof are well known in the art.

In the practice of this invention, the primer composition is applied onto the substrate surface by any of the known means such as dipping, spraying, roll-coating and the like. After application, volatile solvent is removed by drying the coated article until a substantial portion of the solvent evaporates leaving a layer of coating components. The article is then heated to thermally cure the coating components and thus form a primer layer on the surface of the article. It is preferred to thermally cure the primer at a temperature of about 80° C. to about 130° C.

Next, the primed surface of the article is topcoated with a colloidal silica filled thermoset organopolysiloxane. The polysiloxane coating is then thermally cured to form a hard, abrasion resistant protective coating for the article.

The colloidal silica filled organopolysiloxane coatings that are used as topcoats in the practice of this invention are generally dispersions of colloidal silica and hydroxylated silsesquioxane in an alcohol-water medium. Specific examples of suitable polysiloxane coatings are described in U.S. Pat. No 3,986,997 and U.S. Pat. No. 4,355,135, which are hereby incorporated by reference to show the methods of preparing and using the polysiloxane coatings.

The following examples serve to illustrate the invention and should not be construed as limiting the scope of the invention as more fully set out in the claims.

EXAMPLE 1

A solution of thermosetting acrylic resin was formed by dissolving 100 g of Acryloid ® WR-97 in 244.4 g of propylene glycol monomethyl ether and 122.2 g of toluene. Acryloid ®WR-97 is a hydroxyl-functional acrylic resin supplied at 70% solids in 83/17 isopropanol/ethylene glycol monobutyl ether by Rohm and Haas Company, Philadelphia, Pa.

Three primers compositions were prepared by adding respectively, 0.15 g, 0.3 g, and 0.6 g of 3-aminopropyltriethoxysilane to 20 g portions of the acrylic resin solution.

Panels of commercially available transparent polycarbonate (bisphenol-A polycarbonate) were cleaned in a Branson ® ultrasonic vapor degreaser (Branson, Shelton, Conn. U.S.A.) and flow coated with the primer compositions. After air drying for about 15 minutes, the primer coat was heat cured for 15 minutes at 125° C. After cooling the panels were flow coated over a portion of the primed surface with a clear abrasion-resistant siloxane composition corresponding to the material prepared in Example 1 of U.S. Pat. No. 3,986,997. After air drying, the overcoat was heat cured at 125° C. for 1½ hours. The adhesion of the primer and topcoat was evaluated on each of the panels by the crosshatching adhesion test. In this test, a multiple blade tool is employed to cut the coating into a grid pattern of 1 mm squares, adhesive tape is applied to the cross-hatched area and the tape is quickly pulled off. If any squares of coating are removed with the tape, the sample fails the adhesion test. Both primer coat and topcoat passed the adhesion test on all panels.

A control panel was prepared by employing the acrylic resin solution without the silane as the undercoat. Although the undercoat adhered to the panel, the topcoat completely failed to adhere to this undercoat.

EXAMPLE 2

This example is presented to compare other known primers with the inventive primer composition. Three primers were prepared by mixing respectively 0.15 g, 0.30 g, and 0.60 g of 3-mercaptopropyltrimethoxysilane into 20 g portions of the acrylic resin solution prepared in Example 1. Another three primers were prepared by mixing respectively 0.15 g, 0.30 g and 0.60 g of phenyltrimethoxysilane into 20 g portions of the acrylic resin solution prepared in Example 1.

Polycarbonate panels were cleaned and coated as in Example 1 using each of the six primers. In all cases the adhesion of the primer itself to the panel passed the crosshatch test, but the adhesion of the siloxane overcoat to the primer failed the test.

EXAMPLE 3

A solution of thermosetting acrylic resin was prepared by mixing 40 g of Acryloid ® AT-51, 53.5 g of propylene glycol monomethyl ether and 6.5 g of toluene. Acryloid ®AT-51 is a hydroxyl functional thermosetting acrylic resin supplied at 50% solids in 78/22 xylene/n-butanol by Rohm and Haas Company, Philadelphia, Pa.

A primer composition was prepared by adding 0.8 g of N-(2-aminoethyl)-3-aminopropyltrimethoxysilane to 50 g of the acrylic resin solution. The primer composition contained 8 percent by weight silane based on acrylic resin solids. Different ultraviolet light absorbers, 0.2 g, were added to 20 g portions of the primer composition. Degreased polycarbonate panels were coated with the primer compositions and overcoated with the clear siloxane resin as described in Example 1. The primer coat cure was 30 minutes at 125° C. and the topcoat cure was 2 hours at 125° C. Comparison panels were prepared in an equivalent manner but without the silane in the primer compositions. The panels were evaluated for adhesion of both the topcoat and primer coatings and subjected to an accelerated weathering test. The weathering test consists of placing the test panels in a QUV accelerated weathering tester, sold by Q-Panel Company, which is set to cycles of 8 hours of fluorescent ultraviolet light at about 50° C. and 4 hours of dark condensation at about 40° C. Panels were checked for adhesion failure after each 50 hours of weathering. The test results are presented in Table 1.

TABLE 1

| Primer Composition | | Initial Adhesion Test | | Weathering Test |
|---|---|---|---|---|
| Silane | UV Absorber | Primer Coat | Top Coat | Hours Until Adhesion Failure |
| Absent | B | Passed | Passed | 140 |
| Absent | C | Passed | Passed | 140 |
| Present | B | Passed | Passed | 500 |
| Present | C | Passed | Passed | 350 |

B = 2(2'-hydroxy-3',5'-di-tert-amylphenyl)benzotriazole
C = Ethyl-2-cyano-3,3-diphenyl acrylate

EXAMPLE 4

A primer composition was prepared by mixing 40 g of Acryloid ® AT-51, 53.5 g of propylene glycol monomethyl ether, 6.5 g of toluene and 1.6 g of N-(2-aminoethyl)-3-aminopropyltrimethoxysilane. Two ultraviolet light absorber modified primers were prepared by dissolving 0.2 g of hexadecyl -3,5-di-tert-butyl-4-hydroxybenzoate in a 20 g portion of the primer composition and 0.25 g of Sanduvor ® 3206 in another 20 g portion of the primer composition. Sanduvor ® 3206 is an ultraviolet light absorber of the oxalanilide class supplied at 80% concentration in xylene by Sandoz Colors and Chemicals, East Hanover, N.J.

Degreased polycarbonate panels were coated with primer and topcoat as described in Example 3. The coated panels passed the adhesion test with respect to both primer adhesion to panel and topcoat adhesion to primer. The panel primed with the hexadecyl-3,5-di-tert-butyl-4-hydroxybenzoate modified composition failed the adhesion test after 430 hours of accelerated weathering while the panel with the Sanduvor ® 3206 primer did not fail until 500 hours.

EXAMPLE 5

A primer composition was prepared by mixing 30 g of Acryloid ®AT-51, 1.5 g. of N-(2-aminoethyl)-3-aminopropyltrimethoxysilane, 56.4 g of propylene glycol monomethyl ether and 13.2 g of toluene. Various ultraviolet light (UV) absorbers were dissolved in 20 g portions of the primer composition and polycarbonate panels were primed and coated as in Example 3. Adhesion test results for the coated panels are presented in Table 2.

TABLE 2

| Primer Composition | | Initial Adhesion Test | | Weathering Test |
|---|---|---|---|---|
| Silane | UV Absorber | Primer Coat | Top Coat | Hours Until Adhesion Failure |
| Absent* | 0.19 g A | Pass | Pass | 137 |
| Absent* | 0.15 g B | Pass | Pass | 137 |

TABLE 2-continued

| Primer Composition | | Initial Adhesion Test | | Weathering Test Hours Until Adhesion Failure |
|---|---|---|---|---|
| Silane | UV Absorber | Primer Coat | Top Coat | |
| Absent* | 0.15 g C | Pass | Pass | 137 |
| Present | 0.19 g A | Pass | Pass | 800 |
| Present | 0.15 g B | Pass | Pass | 560 |
| Present | 0.15 g C | Pass | Pass | 380 |

A = Sanduvor ® 3206
B = 2(2'-hydroxy-3',5'-di-tert-amylphenyl)benzotriazole
C = Ethyl-2-cyano-3,3-diphenyl acrylate
*Presented for comparison only, primer is outside the scope of this invention

EXAMPLE 6

Water was added to several primer compositions to evaluate the effect of prehydrolyzing the aminofunctional silicon compounds in the composition. Primer (I) was prepared by first mixing 56 g of propylene glycol monomethyl ether, 14 g of toluene, and 0.7 g of water and then adding 6.0 g of 3-aminopropyltriethoxysilane and 27 g of Acryloid ® AT-51. Primer (II) was prepared by first mixing 55.9 g of propylene glycol monomethyl ether, 17.2 g of toluene and 1.7 g of water and then adding 6.9 g of N-(2-aminoethyl)-3-aminopropyltrimethoxysilane and 21.0 g of Acryloid ® AT-51. The primers were modified by adding 0.1875 g of Sanduvor ® 3206 to 20 g portions of each primer.

Cleaned polycarbonate panels were coated with the modified primers and topcoated as described in Example 3. All the coated panels passed the adhesion test with respect to both primer adhesion to panel and topcoat adhesion to primer. Some haze was observed in coatings using modified primer (II), but coatings with primer (I) were clear. Coated panels prepared with modified primer (I) were subjected to accelerated weathering as described in Example 3. Adhesion failure occurred after 430 hours of the accelerated weathering. Equivalent results were obtained when panels were coated by comparable primer compositions without added water.

EXAMPLE 7

A solution of thermosetting acrylic resin was prepared by dissolving Acryloid ® AT-51, 720 g, in 1093.3 of propylene glycol monomethyl ether and 186.7 g of toluene.

A series of primer compositions were prepared by adding various amounts of N-(2-aminoethyl)-3-aminopropyltrimethoxysilane to 200 g portions of the acrylic resin solution. A ultraviolet light absorber, 1.2 g of Sanduvor ® 3206, was added to 100 g portions of the primer compositions.

Panels of commercially available transparent polycarbonate (bisphenol-A polycarbonate) were cleaned in a Branson ® ultrasonic vapor degreaser. The cleaned panels were flow coated with the ultraviolet light absorber modified primer compositions. The panels were allowed to air dry for about 15 minutes and then heat cured at 125° C. for 5 to 10 minutes. After cooling the panels were overcoated with a clear abrasion-resistant siloxane coating corresponding to the material prepared in Example 1 of U.S. Pat. No. 3,986,997. After 10 minutes of air drying, the overcoat was heat cured at 125° C. for 1¾ hours.

The adhesion of the coating on the panels was evaluated by the cross-hatching tape adhesion test. In this test, a multiple blade tool is employed to cut the coating into a grid pattern of 1 mm squares, adhesive tape is applied to the cross-hatched area and the tape is quickly pulled off. If any squares of coating are removed with the tape, the sample fails the adhesion test.

The permanence of adhesion in a humid environment was evaluated using a boiling water test. Coated panels were placed in boiling water and then removed at 15-minute intervals for evaluation of adhesion by the cross-hatching tape test. The panels were also evaluated by the weathering test described in Example 3. The time of adhesion failure is reported in Table 3.

TABLE 3

| Percent Silane Based on Acrylic Resin Solids | Hours in Boiling Water at Adhesion Failure | Weathering Hours Until Adhesion Failure |
|---|---|---|
| 0 | 0 | — |
| 1.7 | 3 | 150 |
| 3.9 | 2.5 | 350 |
| 7.8 | 3 | 1200 |
| 15* | 2.5 | 1200 |
| 23* | 2 | 1100 |
| 31* | 2 | 600 |

*Crazing observed in some coatings

EXAMPLE 8

The primer composition of Example 7 containing 7.8 parts of the silane per 100 parts acrylic resins solids was further diluted with propylene glycol monomethyl ether to form compositions of 10% and 5% total solids. These solutions were used to coat panels as in Example 7. The panels were evaluated in the boiling water test with failure occurring at 3 hours for the 10% solids panels and 3.5 hours for the 5% solids panels.

EXAMPLE 9

A primer composition was prepared by adding 2.7 g of N-(2-aminoethyl)-3-aminopropyltrimethoxysilane to 200 g of the acrylic resin solution described in Example 7.

A series of ultraviolet light absorber modified primer compositions were prepared by adding various amounts of Sanduvor ® 3206 to 50 g portions of the primer composition. Coated panels were prepared as in Example 7 using the primers containing various amounts of ultraviolet light absorber. The results of the cross-hatch adhesion test are given in Table 4.

TABLE 4

| Amount 3206 Added in Grams | Percent UV Absorber in Primer Based on Acrylic Resin Solids | Adhesion Test |
|---|---|---|
| 0.6 | 5 | Passed |
| 1.1 | 9.9 | Passed |
| 1.7 | 15 | Passed |
| 2.3* | 21 | Passed |

*Minor haze streak observed at bottom of panels.

EXAMPLE 10

A primer composition was prepared by combining 0.8 g of N-(2-aminoethyl)-3-aminopropyltrimethoxysilane, 80.2 g of propylene glycol monomethyl ether and 19 g of Acryloid ® AT-70, a carboxyl functional acrylic resin supplied at 50% solids in xylene/2-hydroxyethyl acetate mixture (75/25) by Rohm and Haas Company, Philadelphia, Pa. The composition was divided in half and 0.75 g of DER-732, a bisphenol-A based epoxy resin sold by Dow Chemical Company, Midland, Michigan, was added to one portion.

Polycarbonate panels were cleaned and coated as described in Example 7 except that the primer coat was cured 30 minutes at 125° C. Panels primed with each composition passed the adhesion test but panels primed by the composition without the epoxy resin were slightly hazy, while panels primed with the epoxy resin containing composition were clear.

EXAMPLE 11

An aminofunctional siloxane was prepared by combining N-(2-aminoethyl)-3-aminopropyltrimethoxysilane with 0.7 mole of water and 0.7 mole of a 50/50 mixture of n-octanol/n-decanol. The siloxane product was stripped at 150° C. to remove methanol.

A primer composition was prepared by mixing 10.2 g of toluene, 54.7 g propylene glycol monomethyl ether, 34.2 g Acryloid ® AT-51 and 0.9 g of the amino functional siloxane.

Polycarbonate panels were cleaned and coated as described in Example 7 except that the primer coat was cured for 15 minutes at 125° C. and the overcoat cured for 2 hours at 125° C. The coated panels were clear and passed the adhesion test.

EXAMPLE 12

A primer composition was prepared by mixing 45.2 g of N-(2-aminoethyl)-3-aminopropyltrimethoxysilane, 1130.5 g of Acryloid ® AT-51, 39.1 g of Sanduvor ® 3206, 1926.3 g of propylene glycol monomethyl ether and 397.9 of toluene. Two drops of 100% active PA-57 (a flow out additive of the silicone glycol copolymer type) were added to a 50 g portion of the primer composition and polycarbonate panels were coated as in Example 7 using this primer. The panels passed the adhesion test and were clear. The primer coating was visibly smoother on panels coated with this primer in comparison to panels coated with the same primer composition without the flow out additive.

EXAMPLE 13

A primer composition was prepared by mixing 12.3 g of N-(2-aminoethyl)-3-aminopropyltrimethoxysilane, 307.8 g of Acryloid ® AT-51, 489.2 g of propylene glycol monomethyl ether and 90.7 g of toluene. Various types of plastic panels were cleaned in a Branson ® ultrasonic vapor degreaser and coated by the primer composition and then overcoated by the abrasion resistant siloxane coating employed in Example 7. On the polysulfone panels, the primer coat was cured for 10 minutes at 125° C. and the overcoat was cured for 2 hours at 125° C. On all other panels, the primer coat was cured 30 minutes at 85° C. and the overcoat was cured for 16 hours at 85° C. The adhesion test results are reported in Table 5.

TABLE 5

| Plastic Panel Types | Adhesion Test | Appearance |
|---|---|---|
| Polysulfone | Passed | Clear |
| Cellulose Acetate Butyrate | Passed | Clear |
| Polyester | Failed* | Clear |
| Styrene-Acrylonitrile | Passed | Hazy |
| Bis(allyl)diethylene glycol carbonate | Passed | Clear |

*Although the coating failed the adhesion test, the adhesion was judged significantly improved over that obtained without using the primer.

EXAMPLE 14

A primer composition was prepared by mixing 5.5 g of N-(2-aminoethyl)-3-aminopropyltrimethoxysilane, 136.8 g of Acryloid ® AT-51, 217.4 g of propylene glycol monomethyl ether, 40.3 g of toluene and 4.5 g of Sanduvor ® 3206. Panels of polycarbonate as in Example 7 were coated with this primer and cured for 10 minutes at 125° C. Two of the primed panels were then overcoated with a solution prepared by diluting 50 g of SHC-1200, a commercially available abrasion-resistant siloxane coating supplied by General Electric Co., Pittsfield, Mass., in 25 g of isopropanol and 25 g of n-butanol. Two other primed panels were overcoated with a tintable abrasion resistant siloxane coating prepared as described in U.S. Pat. No. 4,355,135 with a

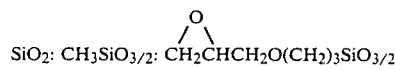

ratio of 50:20:30. Both topcoats were cured for 2 hours at 125° C. All panels passed the adhesion test.

That which is claimed is:

1. A composition containing from 99 to 70 weight percent of organic solvent and 1 to 30 weight percent of coating components consisting essentially of
   (I) a thermosettable acrylic resin and
   (II) from 0.1 to 50 weight percent based on (I) of an aminofunctional organo silicon compound of the general formula

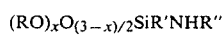

wherein
   R is hydrogen or a monovalent hydrocarbon radical of 1 to 12 carbon atoms,
   R' is a divalent alkylene radical of 3 or 4 carbon atoms,
   R" is a monovalent radical selected from the group consisting essentially of hydrogen, alkyl radicals of 1 to 4 carbon atoms and the —CH$_2$CH$_2$NH$_2$ radical, and
   x has an average value from 0 to 3.

2. The composition of claim 1 wherein x is 3 and R is an alkyl radical of 1 to 4 carbon atoms.

3. The composition of claim 2 wherein R is methyl, R' is trimethylene and R" is —CH$_2$CH$_2$NH$_2$.

4. The composition of claim 2 wherein R is ethyl, R' is trimethylene and R" is hydrogen.

5. The composition of claim 1 wherein x has an average value of 1.5 to 2.0, R' is trimethylene and R" is —CH$_2$CH$_2$NH$_2$.

6. The composition of claim 5 wherein 30 to 50% of the R radicals are alkyl radicals of 8 to 12 carbon atoms and the remaining R radicals are methyl.

7. The composition of claim 1 wherein R is hydrogen, R' is trimethylene and R" is —CH$_2$CH$_2$NH$_2$.

8. The composition of claim 1 wherein R is hydrogen, R' is trimethylene and R" is hydrogen.

9. A composition containing from 99 to 70 weight percent of organic solvent and 1 to 30 weight percent of coating components consisting essentially of
   (I) a thermosettable acrylic resin;
   (II) from 0.1 to 50 weight percent based on (I) of an aminofunctional organo silicon compound of the general formula $(RO)_xO_{3-x/2}SiR'NHR''$ wherein R is hydrogen or a monovalent hydrocarbon radical of 1 to 12 carbon atoms, R' is a divalent alkylene radical of 3 or 4 carbon atoms, R'' is a monovalent radical selected from the group consisting essentially of hydrogen, alkyl radicals of to 4 carbon atoms and the —CH$_2$CH$_2$NH$_2$ radical, and x has an average value from 0 to 3; and (III) from 0.1 to 100 weight percent based on (I) of an ultraviolet light screening compound.

10. The composition of claim 9 wherein x is 3 and R is an alkyl radical of 1 to 4 carbon atoms.

11. The compositions of claim 10 wherein R is methyl, R' is trimethylene and R'' is —CH$_2$CH$_2$NH$_2$.

12. The compositions of claim 10 wherein R is ethyl, R' is trimethylene and R'' is hydrogen.

13. The composition of claim 9 wherein x has an average value of 1.5 to 2.0, R' is trimethylene and R'' is —CH$_2$CH$_2$NH$_2$.

14. The composition of claim 13 wherein 30 to 50% of the R radicals are alkyl radicals of 8 to 12 carbon atoms and the remaining R radicals are methyl.

15. The composition of claim 9 wherein R is hydrogen, R' is trimethylene and R'' is —CH$_2$CH$_2$NH$_2$.

16. The composition of claim 9 wherein R is hydrogen, R' is trimethylene and R'' is hydrogen.

* * * * *

UNITED STATES PATENT AND TRADEMARK OFFICE
CERTIFICATE OF CORRECTION

PATENT NO. : 4,486,565
DATED : December 4, 1984
INVENTOR(S) : Kelly L. Benjamin

It is certified that error appears in the above-identified patent and that said Letters Patent is hereby corrected as shown below:

In Column 5, line 63, "2,2'dihydroxy-4,4'-dimethoxyben-" should read -- 2,2'-dihydroxy-4,4'-dimethoxyben- --.

In Column 5, line 68, the printing is not done well. The line should read: "propoxybenzophenone, 2,2'-dihydroxy-4-methoxy-4'-".

In Column 6, line 38, "an" should read -- as --.

In Column 7, line 10, "primers" should read -- primer --.

In Column 8, line 26, "2(2'-hydroxy-3',5'-di-tert-amylphenyl)-benzotriazole" should read -- 2-(2'-hydroxy-3',5'-di-tert-amylphenyl)benzotriazole --.

In Column 8, line 35, delete the space between "hexadecyl" and "-3,5-di-tert-butyl-4-".

In Column 8, line 40, "suppled" should read -- supplied --.

In Column 9, line 10, "2(2'-hydroxy-3',5'-di-tert-amylphenyl)-benzotriazole" should read -- 2-(2'-hydroxy-3',5'-di-tert-amylphenyl)benzotriazole --.

In Column 9, line 50, "A" should read -- An --.

UNITED STATES PATENT AND TRADEMARK OFFICE
CERTIFICATE OF CORRECTION

PATENT NO. : 4,486,565
DATED : December 4, 1984
INVENTOR(S) : Kelly L. Benjamin

It is certified that error appears in the above-identified patent and that said Letters Patent is hereby corrected as shown below:

In Column 10, line 26, "resins" should read -- resin --.

In Column 13, line 12, "of to" should read -- of 1 to --.

Signed and Sealed this

Seventeenth Day of September 1985

[SEAL]

Attest:

*Attesting Officer*

DONALD J. QUIGG

*Commissioner of Patents and Trademarks—Designate*